Patented Nov. 4, 1941

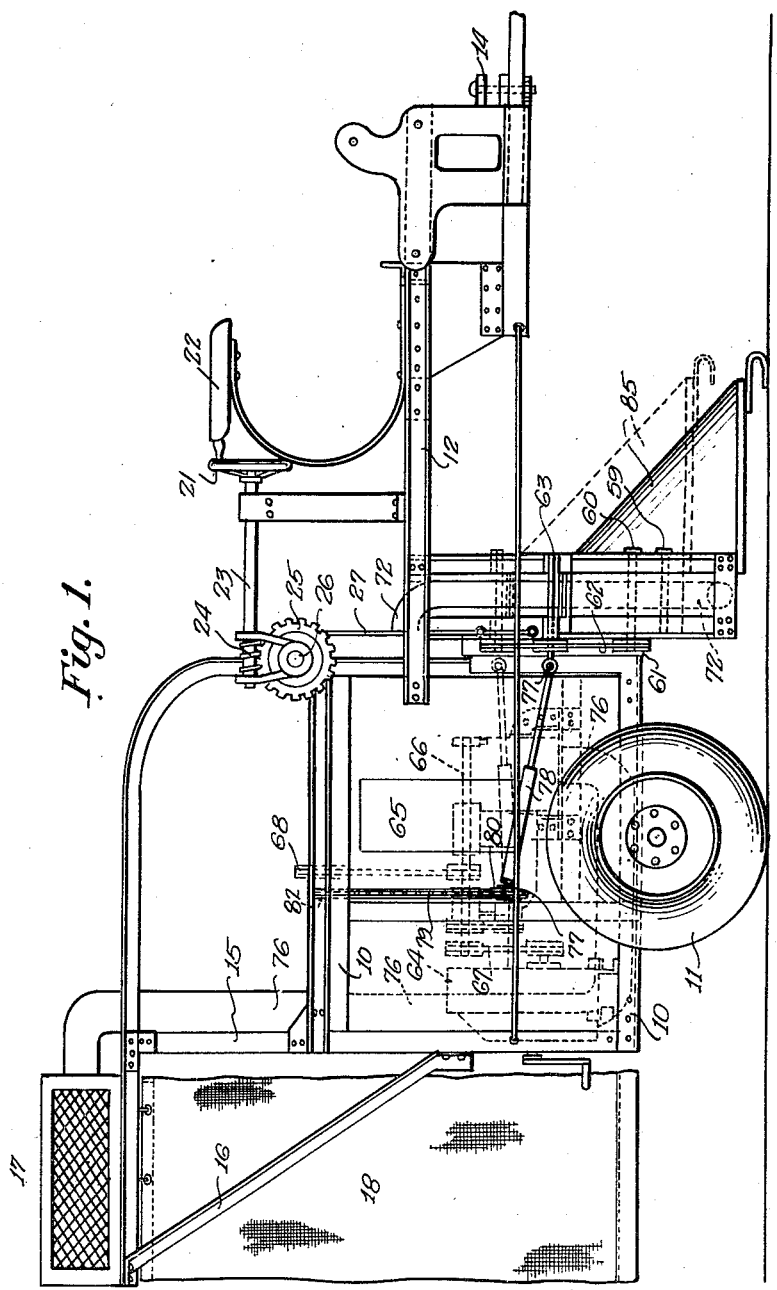

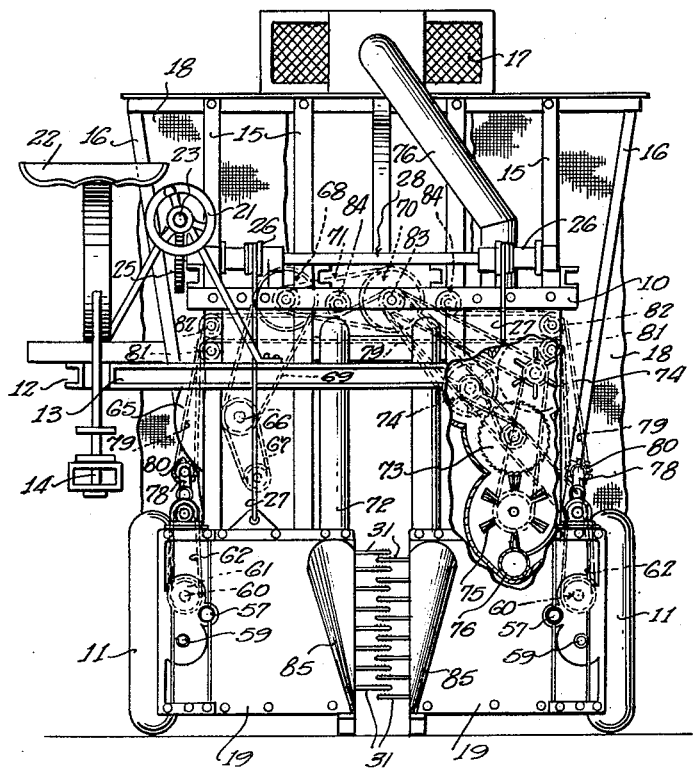

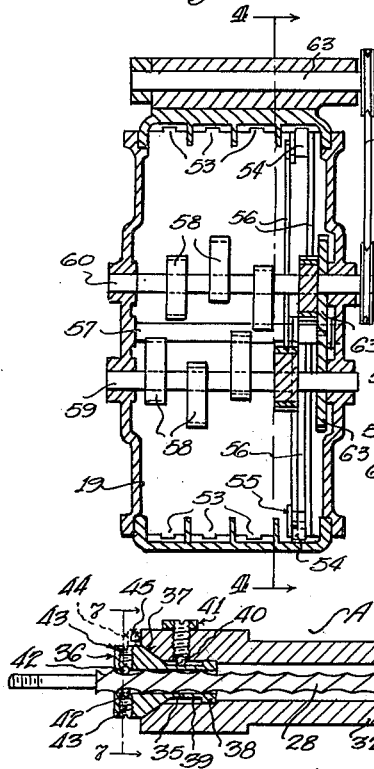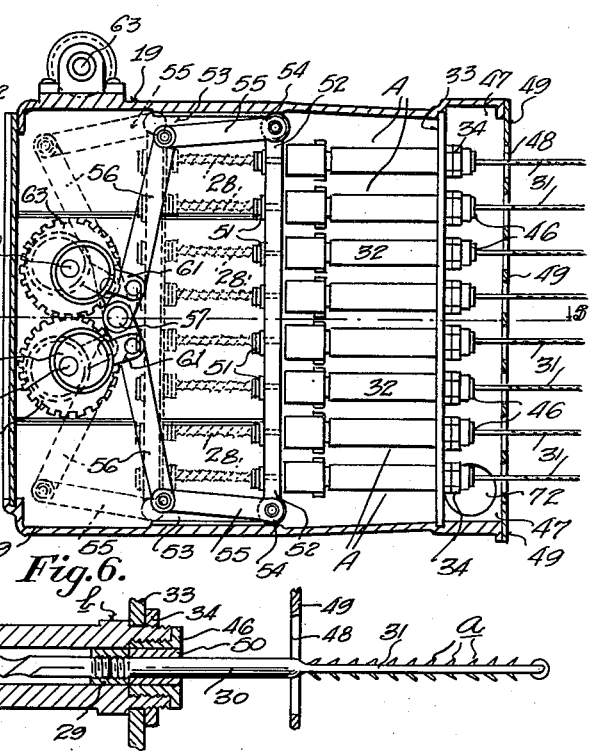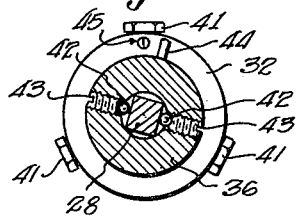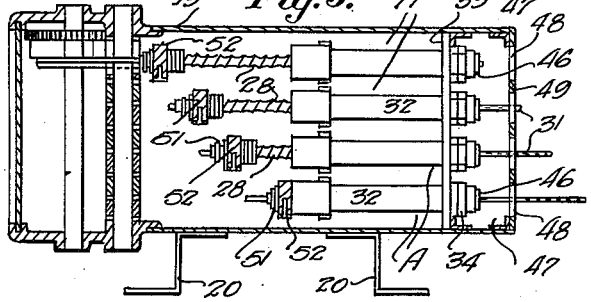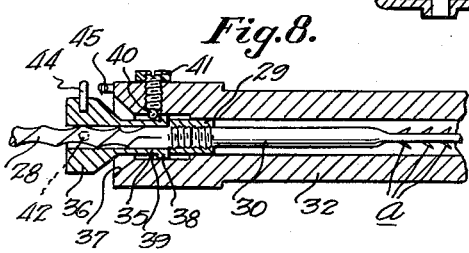

2,261,572

UNITED STATES PATENT OFFICE 2,261,572

COTTON PICKING MACHINE

William Neal Smith, Dallas, Tex.

Application June 30, 1941, Serial No. 400,429

6 Claims. (Cl. 56—41)

This invention relates to a machine for gathering cotton from growing plants of the type employing banks of opposed, rotatable and reciprocable picking needles and it has particular reference to such a machine of ready portability and compactness and whose picking mechanisms will have no damaging effect on the cotton or plant foliage.

The principal object of the invention is to improve upon known types of picking needles and the operating means therefor by the elimination of many gears, sprockets and chains heretofore necessary in the driving assembly and thereby to not only reduce the bulk of the machine to a practical weight for field use but also to simplify the mechanism to such extent as to minimize the skill, expense and effort required to make repairs and replacements on the machine.

Another object of the invention is to provide a novel form of means by which the picking needles are caused to rotate during a forward thrust into the foliage of a cotton plant, yet will cease rotating as the needle is withdrawn to extract the cotton therefrom, thereby to minimize any tendency of the needle to unduly collect dead leaves or other matter with the cotton.

Another object of the invention resides in the provision of means for raising and lowering the picking assemblies with respect to the ground so that proper relationship may be effected between the groups of picking needles and the cotton on stalk of various height.

The objects of the invention hereinbefore enumerated, as well as other and lesser objects are preferably applied as improvements on a cotton picking machine whose construction embodies a preliminary cotton cleaning mechanism to which the picked cotton is subjected prior to its delivery to suitable receptacles suspended rearwardly of the machine and with these objects in view, the invention resides in the combination and arrangement of parts and in the details hereinafter explained and illustrated in the accompanying drawings wherein:

Figure 1 is a side elevation of a cotton picking machine constructed according to the invention.

Figure 2 is a front elevation.

Figure 3 is a vertical section through one of the pair of picking assemblies.

Figure 4 is a vertical section taken on line 4—4 on Figure 3.

Figure 5 is a transverse section taken on line 5—5 on Figure 4.

Figure 6 is a longitudinal sectional view of one of the picker spindle assemblies and operating sleeve.

Figure 7 is a transverse section on line 7—7 on Figure 6, and

Figure 8 is a fragmentary reproduction of Figure 6 but showing the picker spindle operatively disengaged from the collar for non-rotative retraction.

In continuing further and in greater detail with the drawings, it is pointed out that the present invention resides especially in the construction of the picking assemblies disposed one on either side of a row of cotton stalks in opposed relationship and in the construction of the spindle and needle assembly as well as the means for controlling the same and in this connection reference may be had to the co-pending application filed November 12, 1940, Serial Number 365,289, describing another form of such assembly and control.

Referring primarily to Figures 1 and 2 of the drawings, the frame 10 is supported upon wheels 11 on which are mounted preferably pneumatic tires for ready transportation on soft soil. It will be understood that while the drawings show the machine as having an animal hitch, provisions may be conveniently made to provide a tractor hitch. As a means to offset the machine with respect to the direction of pull, a beam 12 is affixed to and extends directly forward from the frame and to this beam is an angularly disposed beam 13, one end of which is joined to the forward end of beam 12 and whose opposite end extends and is connected to the opposite side of the frame 10. Accordingly, the draft animals or tractor, as the case may be, connected to the hitch 14, instead of traveling on either side of the row being harvested, travel in an adjacent and harvested row, thereby preventing waste by knocking off the opened cotton.

At the rear of the frame 10 there is provided a series of upright members 15 and which, assisted by braces 16, support a cage or trap 17 of foraminous material which serves the dual function of a separator and cleaner and in the first function releases the picked cotton from the air stream for precipitation into conveniently disposed sacks 18. The manner in which the cotton is subjected to the preliminary cleaning action after picking and its delivery to the cage 17 will be described after the description of the picker assemblies immediately following.

Referring now to Figures 3, 4 and 5 illustrating the picker assemblies, each of these is comprised of a casing 19, which by means of flanges 20 (Fig. 5) are mounted for vertical sliding movement on the front of the machine frame 10. This movement is effected by means of a hand wheel 21 (Figures 1 and 2) adjacent the operator's seat 22 and which wheel is mounted on a shaft 23 carrying a worm 24. This worm enmeshes a worm gear 25 mounted on a shaft 26 extending transversely across the front of the machine and which carries relatively spaced spools 26. Upon these spools, cables 27 are wound, each depending and connected to a casing containing the spindle operating mechanism. It is apparent therefore that rotation of the shaft will wind or unwind the cables 27 to thereby elevate or lower the picking assemblies.

While there is no limitation as to number intended, each picker assembly has four vertical rows of eight spindles each, broadly indicated by reference character A but whose parts are specifically shown and identified in Figures 6, 7 and 8. It is the object of the mechanism shown to successively actuate the vertical rows of spindles of each assembly and in being positioned as they are on either side of a row of stalks the foliage of the latter will not escape the action of the needles and consequently even the smallest particle of lint exposed will be caught up by the rapidly revolving and reciprocating needles, withdrawn and released into the influence of suction for delivery to the cleaning mechanism and finally to the sacks 17.

The individual spindle and needle assembly is comprised of a shank 28 in which there is produced four spiral grooves by twisting, the shank being square in cross-section. The ends of the shank are lathe turned and threaded as shown and on the inner end a collar 29 is threaded and jointly receives the end of the shank 30 of the picker section 31 carrying barbs $a$ on which the cotton is entwined as the needle is projected into the cotton bearing stalk.

The spindles operate in sleeves 32, each being rigidly mounted at its forward end in apertures provided therefor in a plate 33, a shoulder $b$ (Figure 6) being provided on each sleeve, bearing against plate 33, with a nut 34 threaded onto the extended end of the sleeve to lock the same rigidly to the plate. The spiral section 28 of the spindle operates through a member 35, one end of which has an integral coniform head 36, corresponding to the cone shaped recess 37 in the end of the sleeve 32. The tail or inner end of member 35 is flanged at 38, defining an annular recess 39 between the head 36 and flange 38 to receive a set of three balls 40, each being held in position by a screw 41. The member 35, which shall be hereinafter referred to as the clutch, is capable of longitudinal movement in the bore of the sleeve 32, limited by the balls 40 reposing in the annular recess 39 thereof. When in the position shown in Figure 6 or engaged position, the friction set up by the engaging cone surfaces of the head 36 and recess 37 holds the clutch against rotation, thereby causing the spindle 28 and needle 30—31 to revolve. This action is effected by balls 42 in the head 36, held in the grooves of the spindle shank 28 by means of screws 43. A pin 44 is mounted in the head 36 to extend radially outward and engage a pin 45 in the end of the sleeve 32, thus insuring against rotation of the clutch during the picking thrust of the spindle.

Upon retraction or the stripping movement of the needle, the clutch 36 is moved outward away from the recess 37 of the sleeve and consequently is free to turn with the spindle and therefore has no influence to effect rotation thereof. Accordingly, as the needle or picking section 31 is retracted from a stalk of cotton, such cotton as has been impaled on the barbs $a$ is stripped therefrom by the stripper head 46 at the end of each sleeve 32 after having passed into the suction chamber 47 through apertures 48 in the confronting plates 49. The stripper head 49 embraces an oilless bearing 50 in which the round section 30 of the picker spindle operates (Figure 6).

It is apparent from the foregoing how the spindle is constrained to rotate during its forward or picking thrust and the manner in which the rotating means is rendered inoperative on its retracting movement. The mechanism by which reciprocating movement is imparted to the spindles will now be described.

The inner end of each spindle 28 is mounted in a bearing 51, the latter, in turn, being mounted in a vertical actuating bar 52 in spaced relation to companion bearings, as shown in Figures 4 and 5. It is apparent therefore that as the bars are reciprocated on a horizontal plane, the spindle will be likewise reciprocated. To accomplish this, a series of grooves 53 are provided in the top and bottom of the picker casing 19, serving as tracks for rollers 54 mounted at either end of each actuating bar 52. Connected to the axes of these rollers are links 55 and pivoted to the opposite ends of these links are arms 56 whose inner ends are rotatably mounted on a common transverse shaft 57. Eccentrics 58 are mounted upon shafts 59 and 60, the latter shaft emerging from the casing 19 to receive a driving gear or grooved pulley 61. Arms 62 connect the eccentrics 58 pivotally to the arms 56.

It is apparent from the foregoing that as the shaft 60 is driven by means of chain or belt 62 from the jack shaft 63 atop the casing 19, rotation is imparted to the parallel shaft 59 through enmeshing gears 63. The eccentrics 58 will oscillate to effect a change in the positions of the arms 56 and consequently the links 55, having the effect to reciprocate the actuating bar 52. The rollers 54 operating in the tracks or channels 53 will maintain strict rectilinear travel of the picking spindles, the ends of which are secured, as stated, to the actuating bar.

While the present invention is not especially concerned with the specific cleaning mechanism shown in Figures 1 and 2, its general construction and operation will be briefly described.

The engine for operating the picking units as well as the pre-cleaning mechanism is shown in broken lines in Figure 1 and generally indicated by reference character 64. A large fan in the circular fan housing 65, mounted on shaft 66 is driven by belt 67 (Figure 1) from the engine drive shaft and a pulley 68 is driven by belt 69 (Figure 2). A pulley 70 on a shaft parallel with that of pulley 68 is driven from the latter through a belt 71 and it is from the shaft of this pulley that the cleaning mechanism, to be described presently, is driven.

The cotton stripped from the picker needles 31 as they emerge from the cotton stalks drops into the suction chambers 47 whence it is drawn into pipes 72 by suction set up by the fan in housing 65 and deposited into the cleaning assembly. The cotton is impaled upon the toothed drum 73 of conventional design and clinging leaves, stems and other trash is stripped therefrom by stripper rolls 74. A doffing roll 75 removes the cotton from the drum to be discharged by air pressure of the fan through discharge pipe 76 (Figures 1 and 2) into the cage 17, thence into sacks 18, suspended therebelow, by gravity.

It is understood that the method of driving the series of rolls and drums is not to be limited to that shown inasmuch as this arrangement may be changed from time to time. Moreover, since the drive is clearly apparent from the drawings, it is not considered necessary to describe the same particularly in view of the conventional construction thereof. However, it is pointed out that in order to compensate for the variable positions of the picker units 19, a flexible drive therefor is provided which is effected through the medium of universal joints 77 and telescoping shafts 78 on either side of the machine.

For purposes of illustration, an endless chain or belt 79 (Figure 2) encircles sprockets or pulleys 80 carried by the inner ends of the telescoping shafts 78, the lower lead operating over sprockets or pulleys 81 near the top of the frame (Figure 2) while the upper lead operates over sprockets or pulleys 82 and over a sprocket or pulley 83 mounted on the shaft of wheel 70 and from which it receives its traction. Idler sprockets or pulleys 84, as the case may be, bear upon the chain or belt 79 on either side of its driving sprocket 83 to maintain sufficient tension thereon.

In operation, the engine 64 is set into operation and as the machine is moved along a row of cotton bearing stalks, the inclined guards 85 disposed forwardly of the machine will urge the stalk gently inward into the operating range of the picker needles which are rapidly reciprocating in alternating relationship and rotating during the forward thrust into the stalk foliage No appreciable part of the plant foliage will escape the action of the needles and the cotton extracted therefrom is withdrawn thereby into the suction chamber 47 and conveyed by pipe 72 into the cleaning assembly, thence into the cage 17 by air pressure through pipe 76 for delivery into the sacks 18.

Manifestly, the construction as shown and described is capable of some modification and such modification as may be construed to fall within the scope and meaning of the appended claims is also considered to be within the spirit and intent of the invention.

What is claimed is:

1. In a cotton harvesting machine having a precleaning assembly, a pair of relatively opposed picking assemblies, each comprising a casing, a plurality of vertically spaced rows of spindles arranged for successive reciprocating movement in said casing having axially alined and barbed picking sections, sleeves in which said spindles operate, an actuating bar for each row of spindles, a track for said bar, means for actuating said bar, said means comprising a pair of shafts journaled in said casing, eccentrics arranged in spaced relation on said shaft and having link connection with the ends of said bar, means for rotating said shafts and means for stripping cotton from the picking sections of said spindles preparatory to its passage through said pre-cleaning assembly to a receiver.

2. In a cotton harvesting machine having a pre-cleaning assembly, a pair of cooperative picker units, each comprising a casing having a series of relatively spaced, vertical rows of sleeves stationarily mounted therein, a spindle reciprocable in each of said sleeves having a detachable barbed picking section axially alined therewith, a clutch operative upon the forward movement of said spindle to effect rotation thereof and rendered inoperative upon retraction thereof, an actuating bar for said spindles to which the latter are rotatably connected, a pair of shafts, eccentrics carried by said shafts, links pivotally connecting said eccentrics to said actuating bar, means for rotating said shafts and means for stripping cotton from said barbed picker sections upon retraction for delivery to and passage through said pre-cleaning assembly.

3. In a cotton picking machine, a pair of opposed, cooperative picking units, each comprising a casing having longitudinally disposed and relatively parallel tracks in its top and bottom, a series of relatively spaced and vertically disposed bars having rollers on their ends operating in said tracks, a plurality of collars having their ends secured in apertures in said bars, spindles rotatably and reciprocably disposed in said sleeves, each having an axially alined and detachable barbed picker section, a pair of shafts, eccentrics on said shafts having link connection with the ends of said bars to reciprocate the same to thereby reciprocate said spindles, means for raising and lowering said casings, means for driving the shafts therein, means for stripping said barbed sections and means for conveying stripped cotton through said pre-cleaning assembly to receptacles.

4. In a cotton picking machine, a main wheeled frame, a pair of picker units disposed forwardly of said frame in opposed, confronting relationship for vertical adjustment, each of said units comprising a casing having a perforated front wall, a series of vertical rows of picker spindles having barbed sections reciprocable through the perforations in said wall, a stationary sleeve for each spindle in which the latter reciprocates and rotates, an actuating bar for each vertical row of spindles having rollers at either end, parallel shafts journaled in said casing, eccentrics spaced on said shafts and having pivotal connection with said actuating bars to effect successive movement thereof, means for driving said shafts, means for stripping the barbed sections of said spindles and means for conveying the stripped cotton to a point of disposal.

5. In a cotton picking machine, cotton picking units disposed forwardly of said machine in opposed relationship and arranged for vertical adjustment, each having rotatable and reciprocable spindles having barbed sections to be movable into and out of the foliage of an interposing row of cotton bearing stalks, a stationary sleeve in which each spindle operates, an actuating bar to which an end of the spindles are rotatably connected, relatively parallel shafts carrying eccentrics, a pair of arms pivoted at one end to said actuating bar and constrained against other than pivotal movement at their opposite ends, means connecting said eccentrics to said arms intermediate their ends to effect oscillation thereof and to consequently reciprocate said actuating bars successively, means for stripping cotton from said barbed sections and means for conveying the stripped cotton to receptacles.

6. A cotton picking unit as set forth in claim 5 in which the spindles are in axially alined and separatable sections, one of which is barbed and the other spirally grooved, means effective to rotate said spindles only during the impaling thrust, said means comprising a sleeve having a cone-shaped recess in one end, a tubular member surrounding the spirally grooved section of said spindle and having an annular recess, and a head shaped to conform to said cone-shaped recess and receivable thereon during the impaling thrust of said spindle to hold said member stationary with respect to said sleeve, a pair of balls in said head and reposing in the grooves of said spindle to effect rotation thereof during said impaling thrust, and means reposing in the annular recess of said member to limit retraction thereof during a reverse movement of said spindle to disengage said head from said cone-shaped recess.

WILLIAM NEAL SMITH.